US012665298B2

(12) United States Patent
Yang et al.

(10) Patent No.: US 12,665,298 B2
(45) Date of Patent: Jun. 23, 2026

(54) DECOUPLING APPARATUS, RADIATION UNIT AND ANTENNA

(71) Applicant: Nokia Shanghai Bell Co., Ltd., Shanghai (CN)

(72) Inventors: Wenmin Yang, Shanghai (CN); Qiang Liu, Shanghai (CN); Guangyong He, Shanghai (CN); Kui Huang, Shanghai (CN)

(73) Assignee: Nokia Shanghai Bell Co., Ltd., Shanghai (CN)

( * ) Notice: Subject to any disclaimer, the term of this patent is extended or adjusted under 35 U.S.C. 154(b) by 203 days.

(21) Appl. No.: 18/253,110

(22) PCT Filed: Dec. 2, 2020

(86) PCT No.: PCT/CN2020/133417
§ 371 (c)(1),
(2) Date: May 16, 2023

(87) PCT Pub. No.: WO2022/110261
PCT Pub. Date: Jun. 2, 2022

(65) Prior Publication Data

US 2024/0006764 A1 Jan. 4, 2024

(30) Foreign Application Priority Data

Nov. 27, 2020 (WO) ................ PCT/CN2020/132437

(51) Int. Cl.
*H01Q 5/48* (2015.01)
*H01Q 1/24* (2006.01)
(Continued)

(52) U.S. Cl.
CPC ............... *H01Q 5/48* (2015.01); *H01Q 1/246* (2013.01); *H01Q 1/523* (2013.01); *H01Q 5/42* (2015.01);
(Continued)

(58) Field of Classification Search
CPC ............ H01Q 1/22; H01Q 1/24; H01Q 1/246; H01Q 1/52; H01Q 1/523; H01Q 21/26;
(Continued)

(56) References Cited

U.S. PATENT DOCUMENTS 6,385,033 B1 * 5/2002 Javanifard ........... H10D 84/212 257/532
6,831,615 B2 * 12/2004 Gottl ...................... H01Q 1/246 343/810
(Continued)

FOREIGN PATENT DOCUMENTS

CN 101048786 A 10/2007
CN 104393386 A 3/2015
(Continued)

OTHER PUBLICATIONS

International Search Report for International Application No. PCT/CN2020/133417 dated Aug. 17, 2021.
(Continued)

*Primary Examiner* — Tho G Phan
(74) *Attorney, Agent, or Firm* — Myers Bigel, P.A.

(57) ABSTRACT

In one embodiment, the decoupling apparatus for an antenna, includes a body and a cross-finger portion coupled to the body and configured to change a capacitance of the decoupling apparatus. The cross-finger portion includes a first plurality of fingers extending along a first direction; and a second plurality of fingers extending along the first direction. At least one of the second plurality of fingers is provided between adjacent two fingers of the first plurality of fingers, and at least one of the first plurality of fingers is provided between adjacent two fingers of the second plurality of fingers.

20 Claims, 12 Drawing Sheets

(51) Int. Cl.

| | |
|---|---|
| ***H01Q 1/52*** | (2006.01) |
| ***H01Q 5/42*** | (2015.01) |
| ***H01Q 5/50*** | (2015.01) |
| ***H01Q 9/28*** | (2006.01) |
| *H01Q 21/26* | (2006.01) |
| *H01Q 21/28* | (2006.01) |

(52) U.S. Cl.
CPC ............... *H01Q 5/50* (2015.01); *H01Q 21/26* (2013.01); *H01Q 21/28* (2013.01)

(58) Field of Classification Search
CPC .. H01Q 5/42; H01Q 5/48; H01Q 5/50; H01Q 9/28; H01Q 9/285; H01Q 21/00; H01Q 21/24; H01Q 21/28; G06K 19/00
See application file for complete search history.

(56) References Cited

U.S. PATENT DOCUMENTS

| | | | | |
|---|---|---|---|---|
| 6,856,297 | B1 * | 2/2005 | Durham | H01Q 21/062 343/797 |
| 8,207,569 | B2 * | 6/2012 | Bang | H01G 4/06 257/E27.071 |
| 9,685,433 | B2 * | 6/2017 | Li | H10D 1/64 |
| 9,698,486 | B2 | 7/2017 | Shooshtari et al. | |
| 9,722,323 | B2 | 8/2017 | Yona et al. | |
| 10,476,173 | B2 | 11/2019 | Daojian et al. | |
| 2003/0215003 | A1 | 11/2003 | Bottomley et al. | |
| 2010/0263199 | A1 | 10/2010 | Morton et al. | |
| 2014/0026642 | A1 | 1/2014 | O'Connell | |
| 2016/0149299 | A1 | 5/2016 | Yoo et al. | |
| 2018/0351246 | A1 | 12/2018 | Yu et al. | |
| 2020/0076079 | A1 | 3/2020 | Shan et al. | |

FOREIGN PATENT DOCUMENTS

| | | | |
|---|---|---|---|
| CN | 104681955 | A | 6/2015 |
| CN | 106486775 | A | 3/2017 |
| CN | 106532248 | A | 3/2017 |
| CN | 109687129 | A | 4/2019 |
| EP | 1516174 | A1 | 3/2005 |
| EP | 3490066 | A1 | 5/2019 |

OTHER PUBLICATIONS

Extended European Search Report dated Sep. 19, 2024 in connection with European Application No. 20963149.8.

Ding et al., A low profile cross-shaped element for multi-band base-station antenna. Loughborough Antennas & Propagation Conference 2018 (LAPC 2018). 2018, 4 pages.

Duan et al., Compact dual-band dual-polarized base-station antenna array with a small frequency ratio using filtering elements. IEEE Access. Sep. 4, 2019;7:127800-8.

* cited by examiner

DECOUPLING APPARATUS, RADIATION UNIT AND ANTENNA

CROSS-REFERENCE TO RELATED APPLICATIONS

This application is a national phase under 35 U.S.C. § 371 of PCT International Application No. PCT/CN2020/133417 which has an International filing date of Dec. 2, 2020, which claims priority to PCT International Application No. PCT/CN2020/132437, filed Nov. 27, 2020, the entire contents of each of which are hereby incorporated by reference.

FIELD

Example embodiments of the present disclosure generally relate to the field of wireless communication, and in particular, to a decoupling apparatus, a radiation unit and an antenna.

BACKGROUND

In the field of wireless communication, antennas working at different frequency bands may be integrated into a multi-band antenna. Such a multi-band antenna operates under a wide range of frequency bands. The multi-band antenna with a compact size is highly desired in 4G or 5G communication networks and future generation communication networks. However, antennas working at different frequency bands may interfere with one another. How to reduce the mutual interference among the different frequency bands in a straightforward manner remains a challenge.

SUMMARY

In general, example embodiments of the present disclosure propose a solution for reducing the mutual interference among antennas working at different frequency bands.

In a first aspect, there is provided a decoupling apparatus. The decoupling apparatus for an antenna comprises a body; and a cross-finger portion coupled to the body and configured to change a capacitance of the decoupling apparatus, the cross-finger portion comprising: a first plurality of fingers extending along a first direction; and a second plurality of fingers extending along the first direction, wherein at least one of the second plurality of fingers is provided between adjacent two fingers of the first plurality of fingers, and at least one of the first plurality of fingers is provided between adjacent two fingers of the second plurality of fingers.

In some example embodiments, the decoupling apparatus further comprises a conductive line coupled to the cross-finger portion and extending along the first direction.

In some example embodiments, the first and second plurality of fingers are coplanar and provided on a first plane.

In some example embodiments, the conductive line comprises a first line provided on the first plane and comprising a first end and a second end; and a second line being parallel to the first line and comprising a third end and a fourth end.

In some example embodiments, the second line is provided on a second plane parallel to the first plane; and wherein the first end of the first line and the third end of the second line are connected by a first stud extending along a second direction perpendicular to the first direction; and wherein the second end of the first line and the fourth end of the second line are connected by a second stud extending along the second direction.

In some example embodiments, the second line is provided on the first plane, and wherein the conductive line further comprises a lateral line connecting the first end of the first line and the third end of the second line, and wherein the lateral line is provided on the first plane and forms a U shape with the first and second lines.

In some example embodiments, the first plurality of fingers is provided on a third plane and the second plurality of fingers is provided on a fourth plane parallel to the third plane.

In some example embodiments, each of the first plurality of fingers is separated from an adjacent finger of the second plurality of fingers along a third direction, the third direction being perpendicular to the first direction; and wherein each of the second plurality of fingers is separated from an adjacent finger of the first plurality of fingers along the third direction.

In some example embodiments, the decoupling apparatus is integrally formed.

In some example embodiments, the decoupling apparatus is made of copper.

In a second aspect, there is provided a radiation unit. The radiation unit comprises a radiation part, configured to radiate electromagnetic power in a radiation direction; a feeding part of a plate shape and comprising a decoupling apparatus according to the first aspect; and a base part configured to support and provide grounding for the feeding part.

In some example embodiments, the feeding part comprises a substrate having a first surface and a second surface opposite to the first surface along the second direction.

In some example embodiments, the first plurality of fingers are provided on the first surface and the second plurality of fingers are provided on the second surface.

In some example embodiments, the first and second plurality of fingers are coplanar and provided on the first surface.

In some example embodiments, the decoupling apparatus further comprises a feeding line coupled to the body and adapted to transmit power from a power source to the radiation part.

In some example embodiments, the radiation part comprises two pairs of radiation arms perpendicular to each other; and wherein the feeding part comprises two substrates coupled to the respective radiation arm.

In a third aspect, there is provided an antenna. The antenna comprises a radiation unit according to the second aspect.

BRIEF DESCRIPTION OF THE DRAWINGS

Through the following detailed description with reference to the accompanying drawings, the above and other objectives, features and advantages of the example embodiments disclosed herein will become more comprehensible. In the drawings, several example embodiments disclosed herein will be illustrated in an exemplary and in a non-limiting manner, wherein.

Throughout the drawings, the same or similar reference numerals represent the same or similar element.

DETAILED DESCRIPTION

Figure 1:
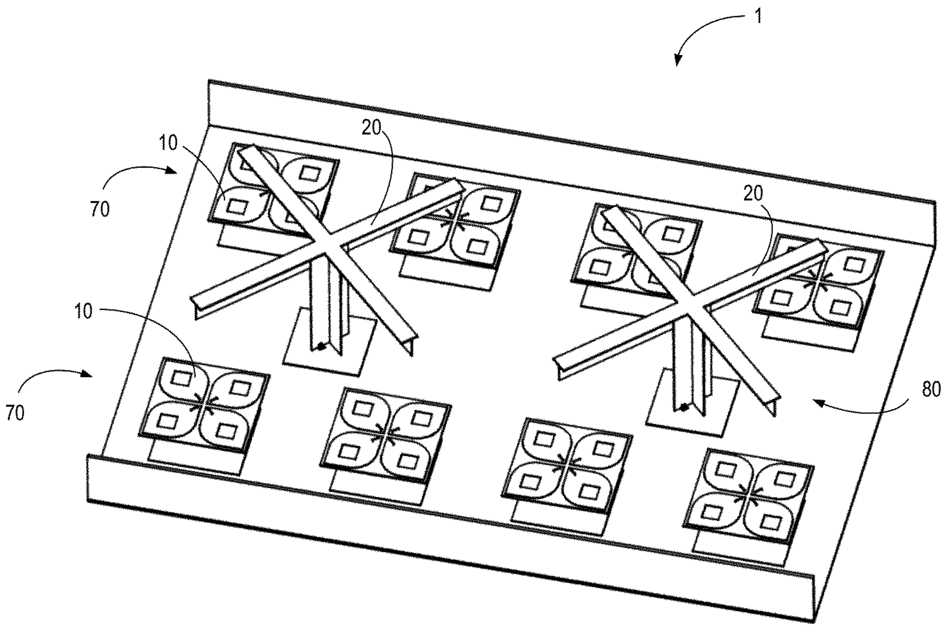
FIG. 1 illustrates an exemplary perspective view of an antenna in accordance with an example embodiment of the present disclosure.

Principles of the present disclosure will now be described with reference to some example embodiments. It is to be understood that these embodiments are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skill in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to apply such feature, structure, or characteristic in connection with other embodiments whether or not explicitly described.

It should be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of only a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future types of communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but is not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In communication networks where a number of network devices are jointly deployed in a geographical area to serve respective cells, a terminal device may have an active connection with a network device when it is located within the corresponding cell. In the active connection, the terminal device may communicate with that network device on the frequency band in both an uplink (UL) and a downlink (DL). The terminal device may need to switch a link in one direction such as the UL to another network device due to various reasons such as quality degradation in the UL.

Conventionally, when the antennas working at different frequency bands are incorporated into a multi-band antenna, the signal emitted from the antenna working at a lower frequency band may be radiated onto the antenna working at a higher frequency band. As a result, an induced current may be exerted, which in turn generates an induced radiation on the antenna working at a lower frequency band. Such a superposition would impose a negative impact on the antenna working at a lower frequency band, thus deteriorating its radiation performance.

Many approaches have been proposed to reduce the electromagnetic coupling among the antennas working under different frequency bands. For example, the antenna boundary may be tuned by enlarging the space and distance between the elements of the antennas. However, such a solution requires much more space and the reduction of the coupling is quite limited. In another known approach, an antenna element for multi-band antenna dual polarization is proposed, in which metal pieces are used to construct a resonant energy storage structure to implement the decoupling on a specific frequency band. However, it is uneasy to adjust the range of the frequency band.

The inventors realize that the interference between the antennas working at different frequency bands can be weakened by filtering the lower frequency band on the antenna working at a higher frequency band. In this way, the superposition of the lower frequency band can be inhibited. The inventors also realize that some structures may be applied to the antennas working under a higher frequency band to act as the equivalent capacitor, the equivalent inductor and/or the equivalent resistor to determine a desired frequency band that can be blocked at the antenna working at a higher frequency band.

FIG. 1 illustrates an example perspective view of an antenna 1 in accordance with example embodiments of the present disclosure. The antenna 1 as described herein may be used in various scenarios. For example, the antenna 1 may be used as a communication module for bidirectional communication. The antenna 1 may comprise sub-antennas working at different frequency bands. The sub-antennas may be divided into two types of sub-antennas, i.e., the sub-antenna(s) working at a higher frequency band and the sub-antenna(s) working at a lower frequency band. The layout of the sub-antennas may be varied according to the actual need of the users.

In the example as illustrated in FIG. 1, a row of lower frequency band sub-antennas 80 and two rows of higher frequency band sub-antennas 70 are included. In such an implementation, the antenna 1 may be referred to as 1L2H multi-band antenna. However, it is to be understood that the numbers of rows of the lower and/or higher sub-antennas are merely exemplary, without suggesting any limitation as to the scope of the present disclosure.

The lower frequency band sub-antenna 80 may include one or more radiation units 20 which work at a lower frequency band. The higher frequency band sub-antenna 70 may include one or more radiation units 10 working at a higher frequency band. For example, as illustrated in FIG. 1, the higher frequency band sub-antenna 70 may include four radiation units 10 working at a higher frequency band. The sub-antenna 80 may include two radiation units 20 working at a lower frequency band. Again, it is to be understood that the numbers of the radiation units are merely exemplary, without suggesting any limitation as to the scope of the present disclosure.

Figure 2:
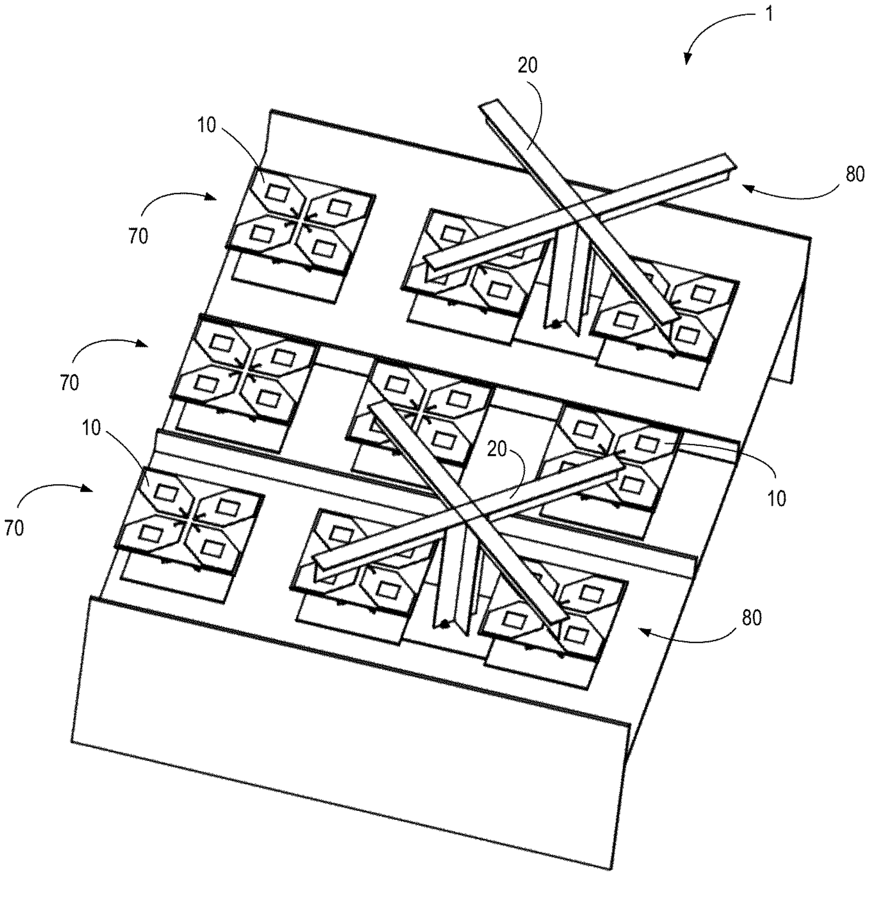
FIG. 2 illustrates an exemplary perspective view of an antenna in accordance with another example embodiment of the present disclosure.

FIG. 2 illustrates another example layout of the antenna 1. In this example embodiment, the antenna 1 comprises two rows of lower frequency band sub-antennas 80 and three rows of higher frequency band sub-antennas 70. In such an implementation, the antenna 1 may be referred to as 2L3H multi-band antenna. Any other suitable layouts are possible as well.

Figure 3:
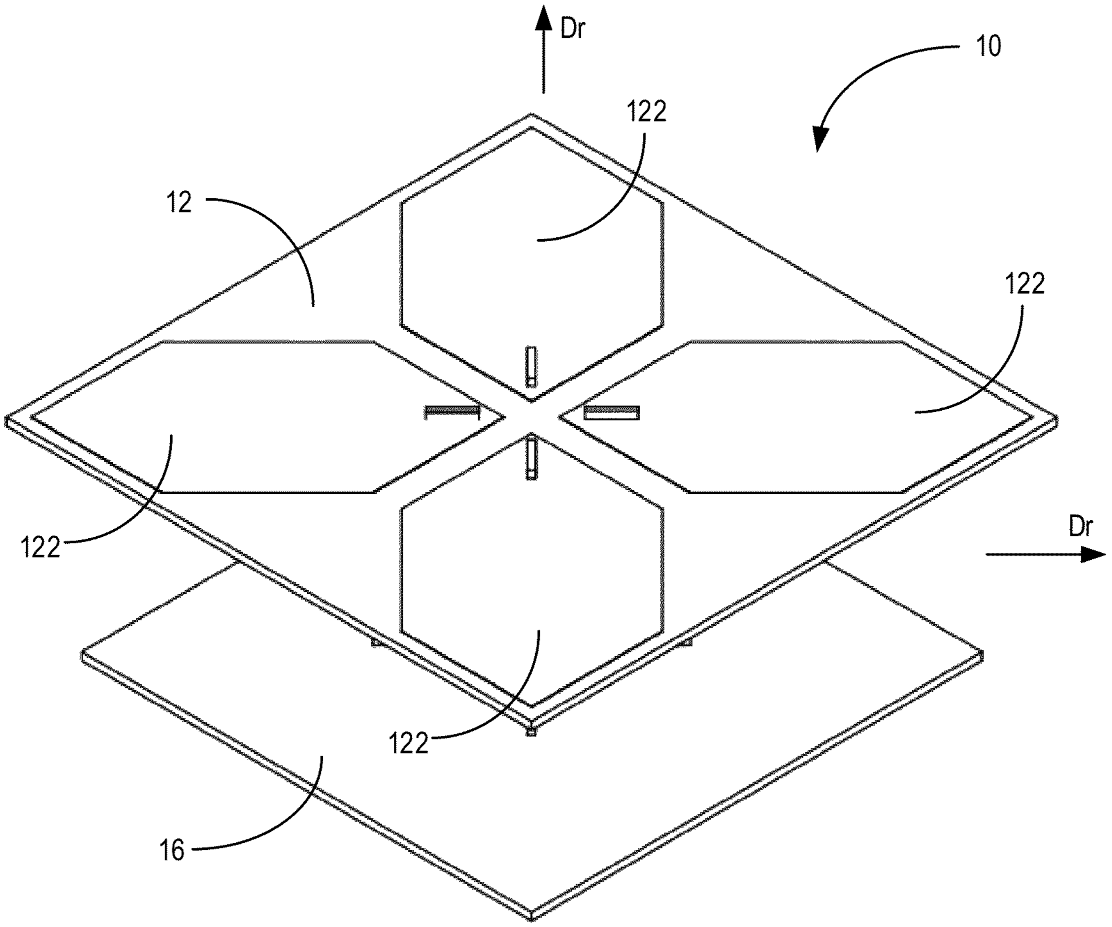
FIG. 3 illustrates an exemplary perspective view of a radiation unit in accordance with an example embodiment of the present disclosure.
Figure 4:
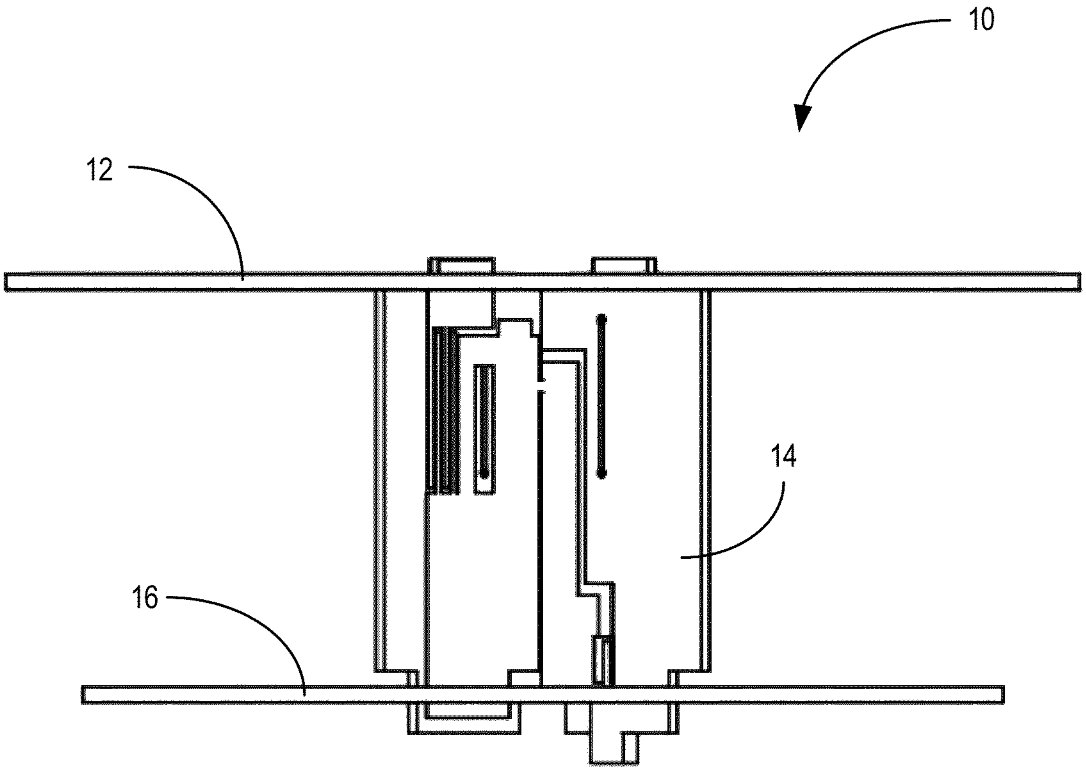
FIG. 4 illustrates an exemplary front view of the radiation unit of FIG. 3.

FIGS. 3 and 4 illustrate a perspective view and a front view of the radiation unit 10 in accordance with an example embodiment of the present disclosure, respectively. In an example embodiment, the radiation unit 10 may be a dipole. As illustrated, the radiation unit 10 generally comprises, from top to bottom, a radiation part 12, a feeding part 14 and a base part 16.

The radiation part 12 is used to radiate electromagnetic power in a radiation direction Dr. The radiation part 12 may comprise one or more radiation arms, which may be used to facilitate the radiation of the electromagnetic power. The number of the radiation arms may be set according to the different industrial requirement of the users. As an example, as illustrated in FIG. 3, four radiation arms 122 are included. The specific numbers of the radiation arms 122 may be determined according to actual implementations and the scope of the present disclosure is not limited in this regard.

The base part 16 is provided to support the radiation unit 10. The base part 16 may also provide grounding for the radiation unit 10. As shown in FIG. 4, the feeding part 14 is provided between the radiation part 12 and the base part 16 and is adapted to provide a power from a power source (not shown) to the radiation part 12.

Referring back to FIG. 1, as the radiation unit 20 work at a relatively lower frequency band and the radiation unit 10 work at a relatively higher frequency band close to each other within a compact space, the interference between the radiation unit 20 and the radiation unit 10 may be generated. For example, the signal emitted from the radiation unit 20 may be radiated onto the radiation unit 10 nearby. The induced current generates an induced radiation on the radiation unit 20. Such an effect would affect the operation of the radiation unit 20. As a result, the radiation performance of the radiation unit 20 may become worse.

Figure 5:
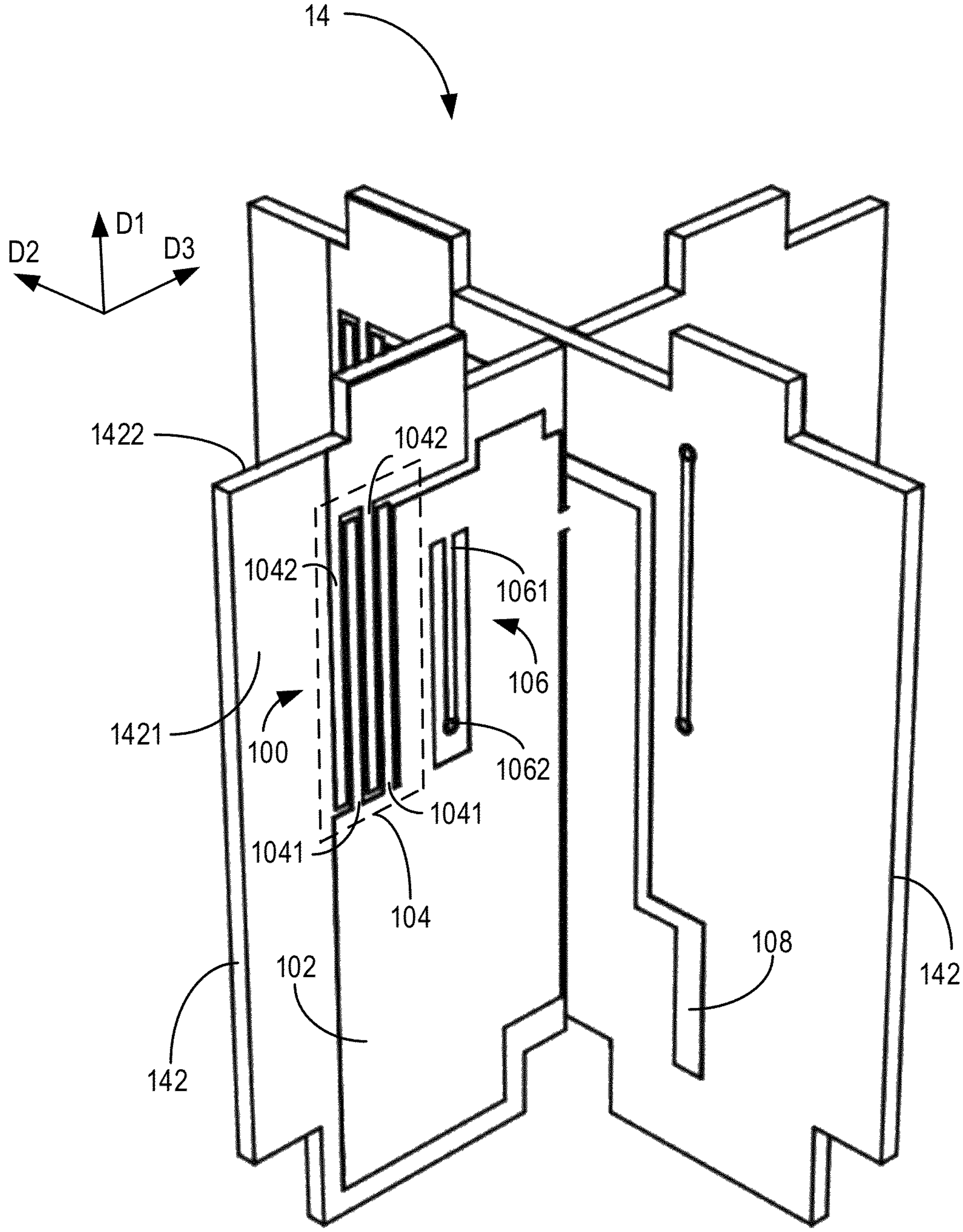
FIG. 5 illustrates an exemplary perspective view of a feeding part of the radiation unit comprising a decoupling apparatus in accordance with an example embodiment of the present disclosure.

FIG. 5 illustrates a perspective view and a front view of the feeding part 14 comprising a decoupling apparatus 100 in accordance with an example embodiment of the present disclosure. The decoupling apparatus 100 may be provided for the radiation unit 10 working at a relatively higher frequency band. One or more feeding parts 14 may be provided, the number of which corresponds to the number of the radiation arms 122. For example, as shown in FIG. 5, two feeding parts 14 crossing each other are shown, and each feeding part 14 includes a substrate 142. As illustrated in FIG. 5, the feeding part 14 generally comprises the substrate 142 and a decoupling apparatus 100 coupled onto a surface 1421 of the substrate 142. It is appreciated that half of the decoupling apparatus 100 is hidden by another substrate 142 in FIG. 5 and it is thus not visible.

Figure 6:
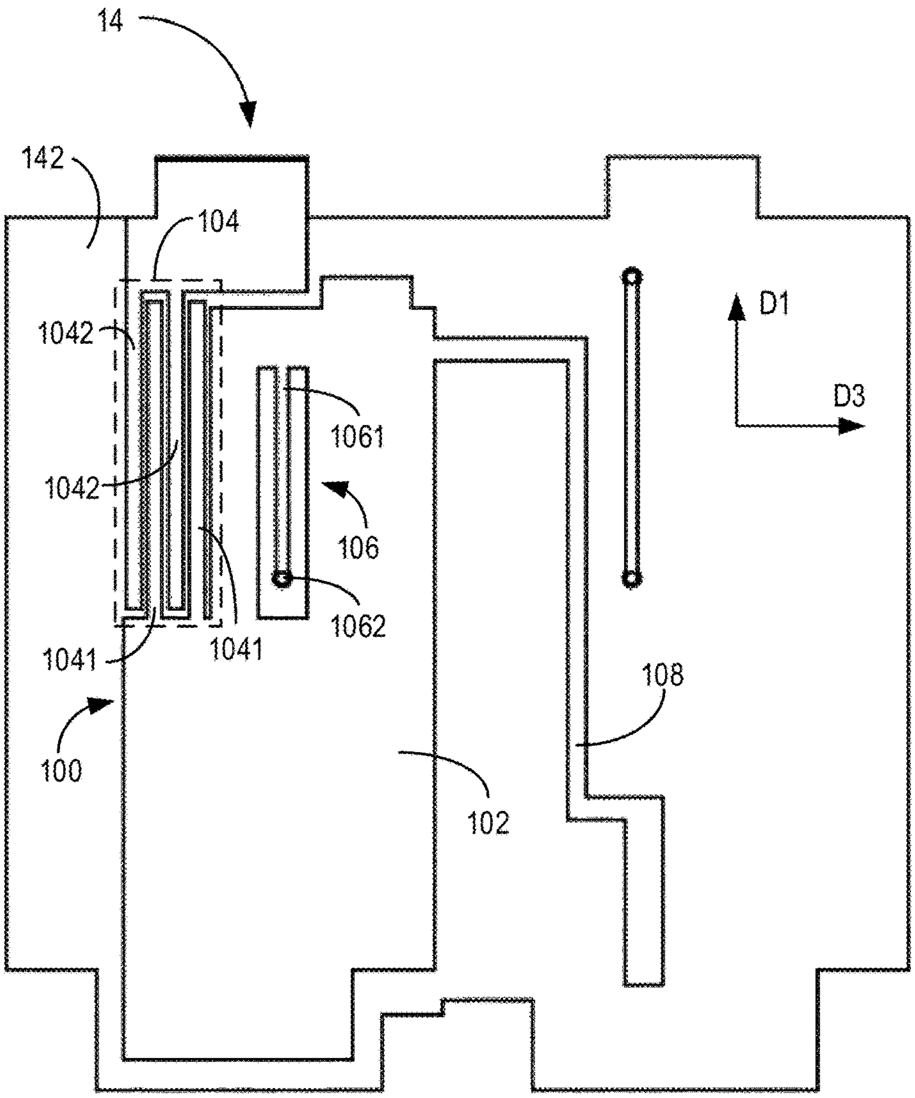
FIG. 6 illustrates an exemplary front view of the feeding part of FIG. 5.

FIG. 6 illustrates a front view of the feeding part 14 comprising the radiation unit 100, which shows the whole front view of the radiation unit 100. As shown, the decoupling apparatus 100 is attached onto the substrate 142. The decoupling apparatus 100 generally comprises a body 102 and a cross-finger portion 104. In an example embodiment, the body 102 may be a balun, which is also referred to as "balanced to unbalanced transformer".

Figure 7:
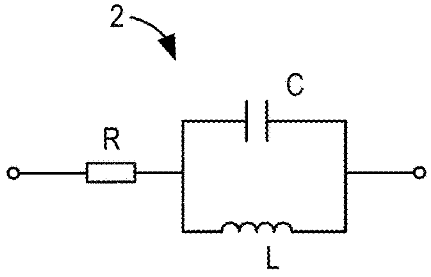
FIG. 7 illustrates an equivalent decoupling circuit in accordance with an example embodiment of the present disclosure.

A principal equivalent decoupling circuit 2 for the decoupling apparatus 100 is shown in FIG. 7. As illustrated, the equivalent decoupling circuit 2 comprises an equivalent capacitor C, an equivalent inductor L and an equivalent resistor R. The equivalent capacitor C and the equivalent inductor L are coupled in parallel and then coupled to the equivalent resistor R in series. The inventors realize that the adjustment of these parameters, i.e., the equivalent capacitor C, the equivalent inductor L and the equivalent resistor R may affect the frequency bands intended to be blocked.

Referring back to FIGS. 5-6, the cross-finger portion 104 as illustrated is coupled to the body 102. The cross-finger portion 104 generally comprises a first plurality of fingers 1041 and a second plurality of fingers 1042. The first plurality of fingers 1041 and the second plurality of fingers 1042 are parallel to each other and extend along a first direction D1. In example embodiments illustrated in FIG. 5, the first plurality of fingers 1041 comprises two fingers and the second plurality of fingers 1042 also comprises two fingers. It is to be understood that this is only for the purpose of illustration, without suggesting any limitations. Other numbers of fingers are also possible.

As can be seen in FIG. 5, the first plurality of fingers 1041 and the second plurality of fingers 1042 are interleaved with each other. As illustrated, one of the second plurality of fingers 1042 is provided between the adjacent two fingers 1041. Also, one of the first plurality of fingers 1041 is provided between the adjacent two fingers 1042. It is to be understood that if the numbers of the first and second fingers 1041, 1042 are more than two, more than one finger 1041 may be provided between the adjacent two fingers 1042. Similarly, more than one finger 1042 may be provided between the adjacent two fingers 1041.

According to example embodiments of the present disclosure, the cross-finger portion 104 interrupts the electrical connection between a top and a bottom of the decoupling apparatus 100. The cross-finger portion 104 functions as an equivalent capacitor C in the equivalent circuit to generate a desired range of frequency band, which can be blocked at the radiation unit 10 working at a higher frequency band. The superposition of the lower frequency band can be inhibited. As a result, the performance of the antenna 1 working at different frequency bands can be kept in good condition, and the gain of the antenna 1 can thus be improved.

In some example embodiments, the specific form of cross-finger portion 104 may affect the capacitance of the equivalent capacitor C. For example, the longer of the fingers 1041, 1042 along the first direction D1, the greater the equivalent capacitance may be. Moreover, the equivalent capacitance is also influenced by the number of the first plurality of fingers 1041 and the second plurality of fingers 1042. For example, an increase in the number of the first plurality of fingers 1041 or the second plurality of fingers 1042 may lead to a decrease in the equivalent capacitance.

In example embodiments of the present disclosure, as illustrated in FIG. 6, the decoupling apparatus 100 may further comprise a conductive line 106. The conductive line 106 is also referred to as a high impedance line. As illustrated, the conductive line 106 is coupled to the body 102 and also extends along the first direction D1. The conductive line 106 may act as the equivalent inductor L in FIG. 6. In some example embodiments of the present disclosure, the length of the conductive line 106 along the first direction D1 may be adjusted to change the equivalent inductance of the decoupling apparatus 100, so as to obtain the desired range of frequency intended to be blocked. In some example embodiments, the longer of the conductive line 106, the greater the equivalent inductance may be. In this way, by adjusting the dimension of the conductive line 106, the accurate range of frequency band to be blocked can be achieved.

Figure 8:
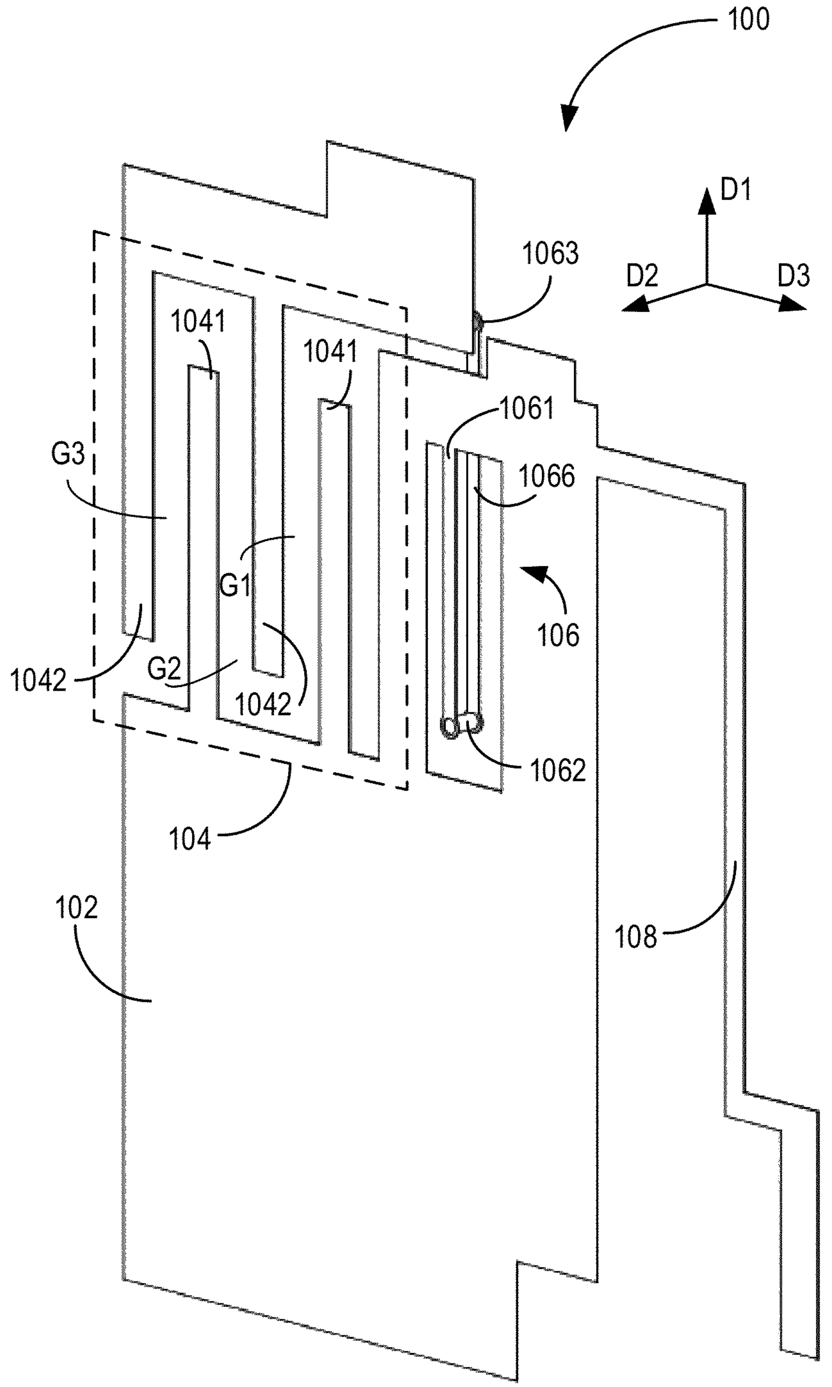
FIG. 8 illustrates an exemplary perspective view of the decoupling apparatus of FIG. 6.

FIG. 8 illustrates a perspective view of the decoupling apparatus 100 as illustrated in FIG. 6. As illustrated, the first plurality of fingers 1041 may be coplanar with the second plurality of fingers 1042. In this way, the first plurality of fingers 1041 and the second plurality of fingers 1042 can be made with a single sheet, the decoupling apparatus 100 can be made in a more convenient manner with lower cost.

In some example embodiments, as illustrated in FIG. 8, the conductive line 106 may comprise a first line 1061 and a second line 1066 parallel to each other. As illustrated, the first line 1061 is provided coplanar with the first plurality of fingers 1041 and the second plurality of fingers 1042. The first line 1061 comprises a first end and a second end and the second line 1066 comprises a third end and a fourth end.

In some example embodiments, the second line 1066 is not coplanar with the first line 1061. For example, as illustrated in FIG. 8, the second line 1066 is provided on a second plane that is parallel to and separated from a first plane on which the first line 1061 is provided. The decoupling apparatus 100 may further comprise a first stud 1062 and a second stud 1063. The first stud 1062 extends along a second direction D2 normal to the first direction D1 to connect the first end of the first line 1061 and the third end of the second line 1066. Referring back to FIG. 5, the first stud 1062 may penetrate through the substrate 142 along the second direction D2. The second stud 1063 extends along the second direction D2 to connect the second end of the first line 1061 and the fourth end of the second line 1066. In this way, the first line 1061 and the second line 1062 form a complete circuit to act as the equivalent inductor L in the equivalent circuit.

Figure 9:
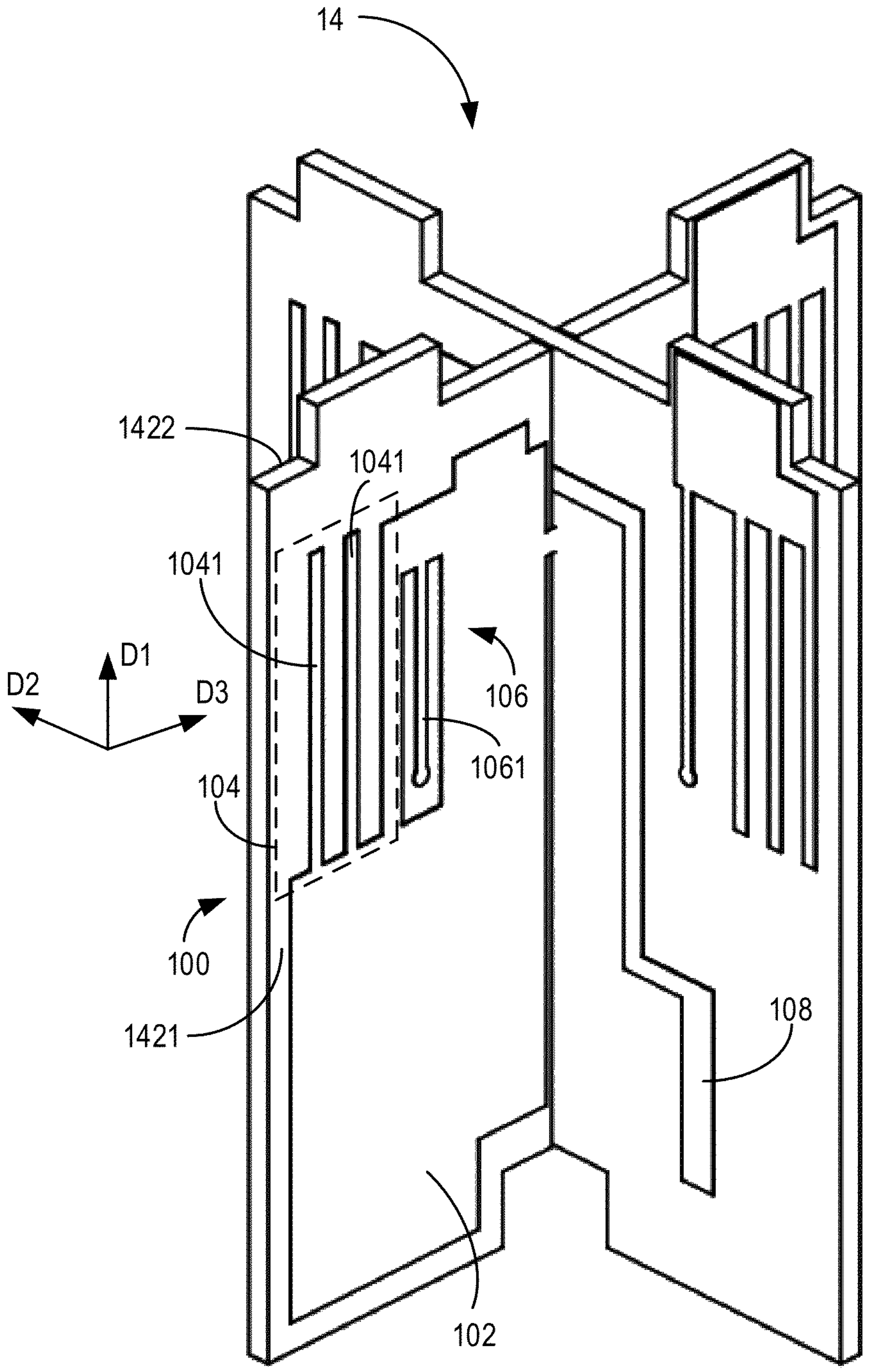
FIG. 9 illustrates an exemplary perspective view of a feeding part comprising a decoupling apparatus in accordance with another example embodiment of the present disclosure.
Figure 10:
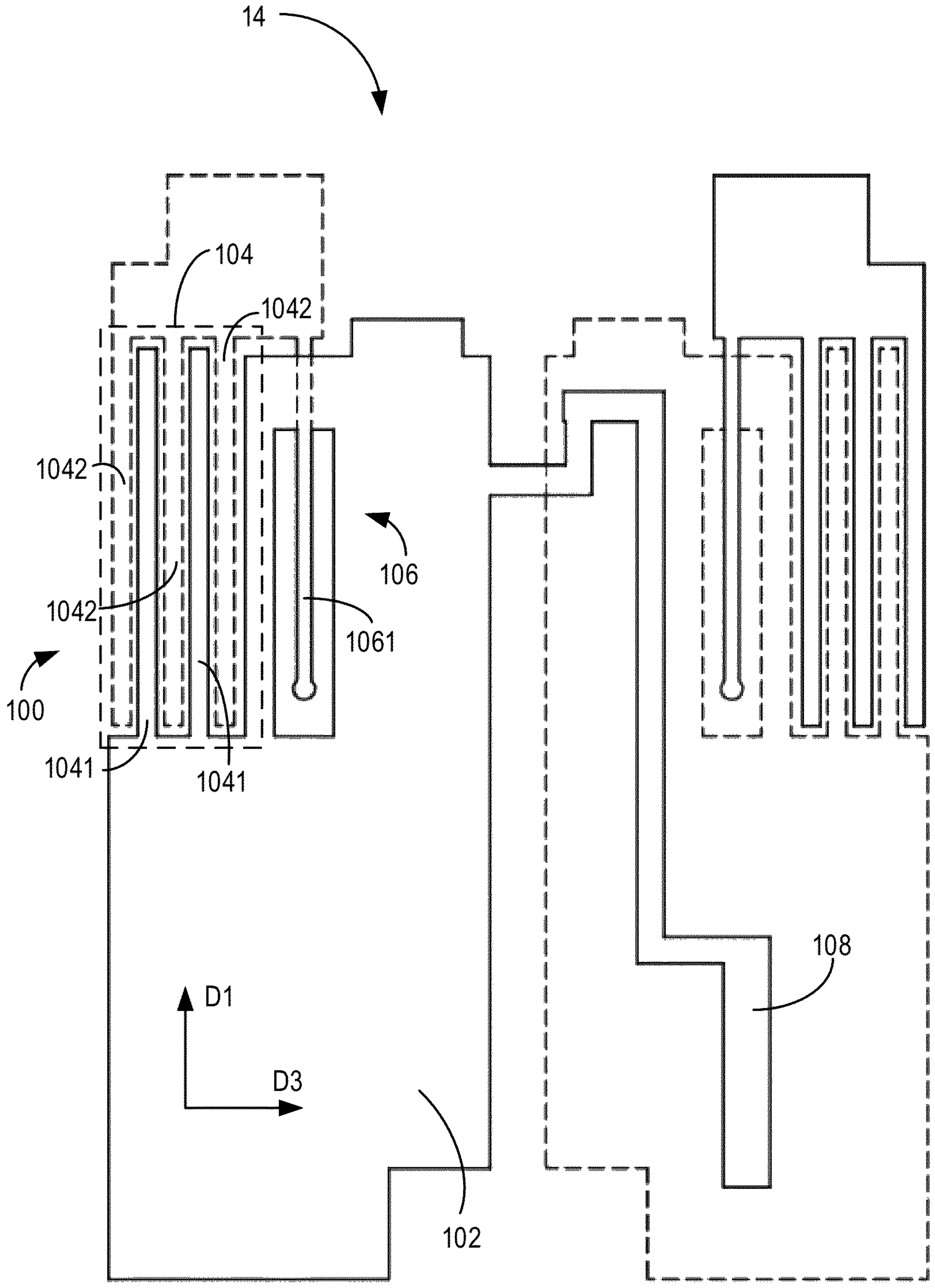
FIG. 10 illustrates an exemplary front view of the feeding part of FIG. 9.

FIGS. 9 and 10 illustrate a perspective view and a front view of a feeding part 14 comprising a decoupling apparatus 100 in accordance with another example embodiment of the present disclosure.

In some example embodiments, the first plurality of fingers 1041 may be non-planar with the second plurality of fingers 1042. For example, with reference to FIG. 9, among the cross-finger portion 104, only the first plurality of fingers 1041 are visible. The first plurality of fingers 1041 is provided on the first surface 1421, a front side of the substrate 142, which can be seen in FIG. 9. The second plurality of fingers 1042 is provided on the second surface 1422, a back side of the substrate 142, which cannot be seen in FIG. 9. With reference to FIG. 10, the solid lines represent the first plurality of fingers 1041 which are visible in the front view, while the broken lines represent the second plurality of fingers 1042 which are invisible in the front view. In this way, the first plurality of fingers 1041 and the second plurality of fingers 1042 couple the substrate 142 at both sides, the stability of the connection can be thus increased.

Figure 11:
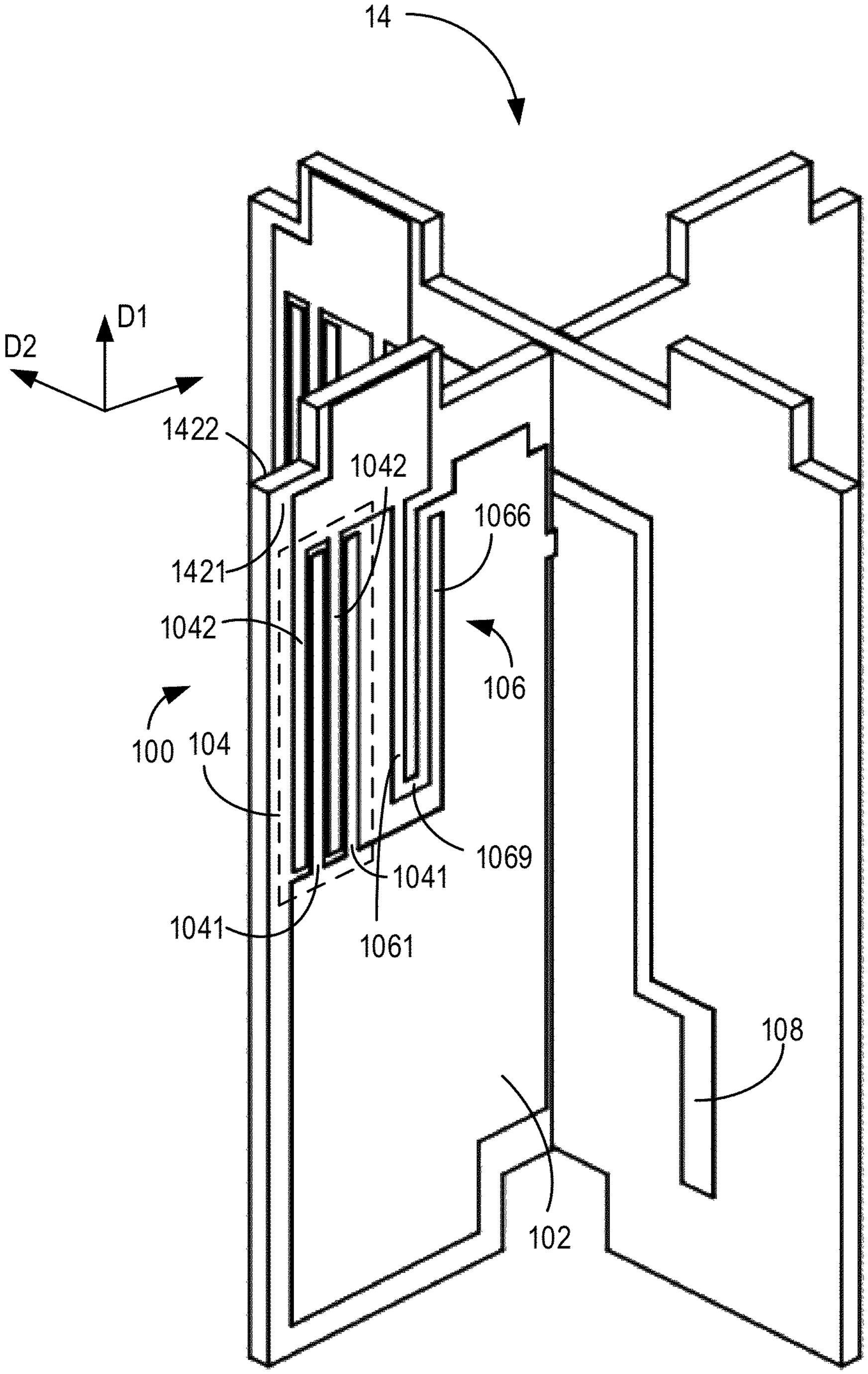
FIG. 11 illustrates an exemplary perspective view of a feeding part comprising a decoupling apparatus in accordance with a further example embodiment of the present disclosure.
Figure 12:
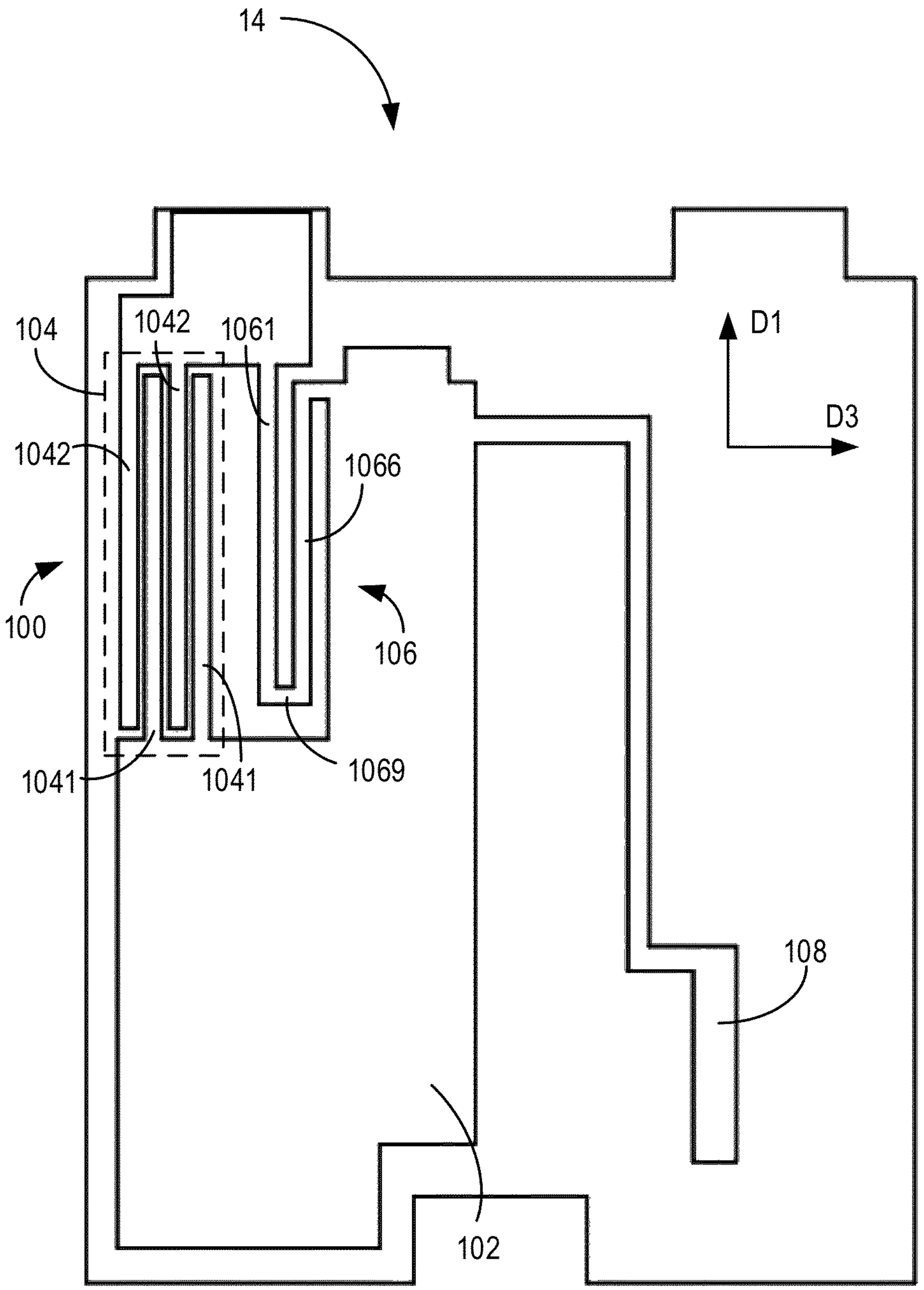
FIG. 12 illustrates an exemplary front view of the feeding part of FIG. 11.

FIGS. 11 and 12 illustrate a perspective view and a front view of a feeding part 14 comprising a decoupling apparatus 100 in accordance with a further example embodiment of the present disclosure.

Unlike the conductive lines 106 as shown in FIGS. 5 and 9, the conductive line 106 as shown in FIG. 11 comprises a first line 1061 and the second line 1066 that are coplanar to each other. In some example embodiments, the conductive line 106 may further comprise a lateral line 1069. The lateral line 1069 connects the first end of the first line 1061 and the third end of the second line 1066 and forms a U shape. As shown, the first and second lines 1061, 1066, the lateral line 1069, the first and second plurality of fingers 1041, 1042 are provided on a same face. In this way, the decoupling apparatus 100 can be made thinner.

In some example embodiments, with reference back to FIG. 8, along the third direction D3 normal to the first direction D1, each of the first plurality of fingers 1041 is separated from an adjacent finger of the second plurality of fingers 1042. In this example embodiment, for the first finger 1041 located at the right, there is gap G1 between the first finger 1041 and the adjacent second finger 1042. For the first finger 1041 located at the middle, there are gaps G2 and G3 between the first finger 1041 and the adjacent two second fingers 1042. Similarly, each of the second plurality of fingers 1042 is separated from an adjacent first finger of the first plurality of fingers 1041 along the third direction D3. As discussed above, the adjustment of equivalent capacitance of the equivalent decoupling circuit can be optimized to change the range of frequency band blocked by the decoupling apparatus 100. For example, the distances between the first plurality of fingers 1041 and the second plurality of fingers 1042, i.e., the sizes of the gaps G1-G3 may influence the equivalent capacitance. In this way, an accurate range can thus be achieved, and the interference between the higher and lower frequency bands can be further reduced.

In some example embodiments, the sizes of the gaps G1-G3 may be identical to each other. In other example embodiments, the sizes of the gaps G1-G3 may be different from each other. The specific values of the sizes of the gaps may depend on the actual need of the users.

In some example embodiments, the decoupling apparatus 100 may be integrally formed. In some example embodiments, the decoupling apparatus 100 may be made of copper. It is to be understood that copper is just an example, and the decoupling apparatus 100 may be of any other suitable materials, e.g., aluminum. The specific materials are not limited to example embodiments of the present disclosure.

In some example embodiments, the decoupling apparatus 100 may further comprise a feeding line 108 coupled to the body. The feeding line 108 is adapted to transmit power from a power source to the radiation part 12.

Referring back to FIG. 3, the two pairs of radiation arms 122 of the radiation part 12 as illustrated are perpendicular to each other. The feeding part 14 comprises two substrates 142 coupled to the respective radiation arm 122. With reference to FIG. 5, each substrate 142 comprises two decoupling apparatus 100 at both sides, so that four decoupling apparatuses 100 corresponding to the four radiation arms 122 are included in the feeding part 14.

The present invention provides a radiation unit 10 with decoupling characteristics, which is generated by the decoupling apparatus 100 designed with the feeding part 14. By changing the structure of the cross-finger portion 104 or the conductive line 106, the equivalent capacitance and the equivalent inductance can be adjusted to reduce the interference among the antennas working at different frequency bands.

With the radiation unit 10 in accordance with the present disclosure, the interference among the radiation units 10 in the multi-band antenna can be reduced. Thus, the gain of the antenna can be greatly improved. In the conventional method, in order to reduce the interference among different frequency bands, the distance between the antennas has to be increased, which greatly enlarges the dimension of the whole antenna. Compared with the conventional methods, the antenna 1 according to example embodiments of the present disclosure can be made in a compact manner.

According to example embodiment, an antenna 1 comprising the decoupling apparatus 100 is provided. The antenna 1 is applicable in various layouts. For example, the antenna 1 may be used in the antenna layout, as illustrated in FIG. 1 or FIG. 2. It is to be understood that this is merely illustrative. The antenna 1 may also be used in other antenna layouts.

Figure 13:
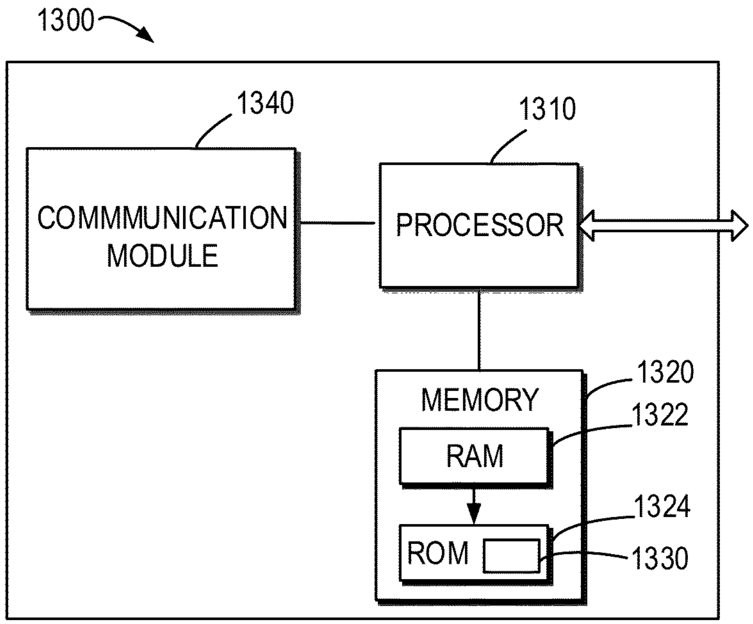
FIG. 13 illustrates a simplified block diagram of an apparatus that is suitable for implementing example embodiments of the present disclosure.

FIG. 13 is a simplified block diagram of a device 1300 that is suitable for implementing example embodiments of the present disclosure. The device 1300 may be provided to implement the communication device, for example the terminal device 120, the network device 111 or the network device 112 as shown in FIG. 1. As shown, the device 1300 includes one or more processors 1310, one or more memories 1320 coupled to the processor 1310, and one or more communication modules 1340 coupled to the processor 1310.

The communication module 1340 may comprise the antenna 1 as illustrated in FIG. 1. The communication module 1340 is for bidirectional communications. The communication module 1340 has at least one antenna to facilitate communication. The communication interface may represent any interface that is necessary for communication with other network elements.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the memory, e.g., ROM 1324. The processor 1310 may perform any suitable actions and processing by loading the program 1330 into the RAM 1322.

Example embodiments of the present disclosure may also be implemented by hardware or by a combination of software and hardware.

In some example embodiments, the program 1330 may be tangibly stored on a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any type of tangible non-volatile storage, such as ROM, EPROM, a flash memory, a hard disk, CD, DVD, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A radiation unit, comprising:

a radiation part configured to radiate electromagnetic power in a radiation direction;

a feeding part of a plate shape and comprising a decoupling apparatus, the decoupling apparatus comprising:

a body; and a cross-finger portion coupled to the body and configured to change a capacitance of the decoupling apparatus, the cross-finger portion comprising:

a first plurality of fingers extending along a first direction; and a second plurality of fingers extending along the first direction, wherein at least one of the second plurality of fingers is provided between adjacent two fingers of the first plurality of fingers, and at least one of the first plurality of fingers is provided between adjacent two fingers of the second plurality of fingers; and a base part configured to support and provide grounding for the feeding part.

2. The radiation unit of claim 1, wherein the decoupling apparatus further comprises:

a conductive line coupled to the cross-finger portion and extending along the first direction.

3. The radiation unit of claim 2, wherein the first and second plurality of fingers are coplanar provided on a first plane.

4. The radiation unit of claim 3, wherein the conductive line comprises:

a first line provided on the first plane and comprising a first end and a second end; and a second line being parallel to the first line and comprising a third end and a fourth end.

5. The radiation unit of claim 4, wherein the second line is provided on a second plane parallel to the first plane; and wherein the first end of the first line and the third end of the second line are connected by a first stud extending along a second direction perpendicular to the first direction; and wherein the second end of the first line and the fourth end of the second line are connected by a second stud extending along the second direction.

6. The radiation unit of claim 4, wherein the second line is provided on the first plane, and wherein the conductive line further comprises a lateral line connecting the first end of the first line and the third end of the second line, and wherein the lateral line is provided on the first plane and forms a U shape with the first and second lines.

7. The radiation unit of claim 1, wherein the first plurality of fingers is provided on a third plane and the second plurality of fingers is provided on a fourth plane parallel to the third plane.

8. The radiation unit of claim 1, wherein each of the first plurality of fingers is separated from an adjacent finger of the second plurality of fingers along a third direction, the third direction being perpendicular to the first direction; and wherein each of the second plurality of fingers is separated from an adjacent finger of the first plurality of fingers along the third direction.

9. The radiation unit of claim 1, wherein the decoupling apparatus is integrally formed.

10. The radiation unit of claim 1, wherein the decoupling apparatus is made of copper.

11. The radiation unit of claim 1, wherein:

the feeding part comprises a substrate having a first surface and a second surface opposite to the first surface along a second direction perpendicular to the first direction; and the first plurality of fingers are provided on the first surface and the second plurality of fingers are provided on the second surface.

12. The radiation unit of claim 1, wherein:

the feeding part comprises a substrate having a first surface and a second surface opposite to the first surface along a second direction perpendicular to the first direction; and the first and second plurality of fingers are coplanar and provided on the first surface.

13. The radiation unit of claim 1, wherein the decoupling apparatus further comprises a feeding line coupled to the body and adapted to transmit power from a power source to the radiation part.

14. The radiation unit of claim 1, wherein the radiation part comprises two pairs of radiation arms perpendicular to each other; and wherein the feeding part comprises two substrates coupled to the respective radiation arm.

15. An antenna comprising:

a radiation unit of claim 1 configured to radiate electromagnetic power in a first frequency range; and a second radiation unit configured to radiate electromagnetic power in a second frequency range that is lower than the first frequency range.

16. A radiation unit, comprising:

a radiation part comprising a plurality of radiation arms;

a feeding part that is coupled to the radiation part, the feeding part comprising a decoupling apparatus, the decoupling apparatus comprising:

a first metal plate having a plurality of first metal fingers extending therefrom; and a second metal plate having a plurality of second metal fingers extending therefrom, where the first metal fingers are interleaved with the second metal fingers.

17. The radiation unit of claim 16, wherein the first metal plate, the second metal plate, the plurality of first metal fingers and the plurality of second metal fingers are all formed on a first surface of a substrate.

18. The radiation unit of claim 17, wherein the decoupling apparatus further comprises an inductive coupling line that electrically connects the first metal plate to the second metal plate.

19. The radiation unit of claim 18, wherein the inductive coupling line is formed solely on the first surface of the substrate.

20. The radiation unit of claim 18, wherein the inductive coupling line comprises a first portion that is formed on the first surface of the substrate and a second portion that is formed on a second surface of the substrate.

* * * * *